US012008077B1

(12) United States Patent
Hester

(10) Patent No.: US 12,008,077 B1
(45) Date of Patent: *Jun. 11, 2024

(54) TRAINING ACTION-SELECTION NEURAL NETWORKS FROM DEMONSTRATIONS USING MULTIPLE LOSSES

(71) Applicant: DeepMind Technologies Limited, London (GB)

(72) Inventor: Todd Andrew Hester, London (GB)

(73) Assignee: DeepMind Technologies Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/120,912

(22) Filed: Mar. 13, 2023

Related U.S. Application Data

(63) Continuation of application No. 16/174,148, filed on Oct. 29, 2018, now Pat. No. 11,604,941.

(60) Provisional application No. 62/578,367, filed on Oct. 27, 2017.

(51) Int. Cl.
| | | |
|---|---|---|
| G06N 3/08 | (2023.01) |
| G06F 17/11 | (2006.01) |
| G06F 18/214 | (2023.01) |
| G06N 3/045 | (2023.01) |

(52) U.S. Cl.
CPC .......... *G06F 18/2148* (2023.01); *G06F 17/11* (2013.01); *G06N 3/045* (2023.01); *G06N 3/08* (2013.01)

(58) Field of Classification Search
CPC . F16L 3/14; F16L 3/20; G01D 5/2417; G01R 27/2605; G06F 17/11; G06F 18/2148; G06F 2203/04111; G06F 2203/04112; G06F 3/0412; G06F 3/0418; G06F 3/044; G06F 3/0445; G06F 3/0446; G06N 3/006; G06N 3/045; G06N 3/0464; G06N 3/08; G06N 3/084; G06N 3/09; G06N 3/092; G06V 10/764; G06V 10/82; H03K 17/962
See application file for complete search history.

(56) References Cited

U.S. PATENT DOCUMENTS

| | | | | |
|---|---|---|---|---|
| 9,536,191 B1 * | 1/2017 | Arel | ........................ | G06N 20/00 |
| 9,754,221 B1 * | 9/2017 | Nagaraja | ................ | G06N 3/045 |
| 10,282,662 B2 * | 5/2019 | Schaul | ................... | G06N 3/088 |
| 10,650,310 B2 * | 5/2020 | Schaul | ................... | G06N 3/047 |

(Continued)

OTHER PUBLICATIONS

Abbeel et al. "An application of reinforcement learning to aerobatic helicopter flight," Advances in Neural Information Processing Systems, Dec. 2007, 8 pages.

(Continued)

*Primary Examiner* — Tsung Yin Tsai
(74) *Attorney, Agent, or Firm* — Fish & Richardson P.C.

(57) ABSTRACT

A method of training an action selection neural network to perform a demonstrated task using a supervised learning technique. The action selection neural network is configured to receive demonstration data comprising actions to perform the task and rewards received for performing the actions. The action selection neural network has auxiliary prediction task neural networks on one or more of its intermediate outputs. The action selection policy neural network is trained using multiple combined losses, concurrently with the auxiliary prediction task neural networks.

20 Claims, 3 Drawing Sheets

(56) References Cited

U.S. PATENT DOCUMENTS

| | | | | |
|---|---|---|---|---|
| 10,748,039 | B2* | 8/2020 | Ionescu | G06V 10/7788 |
| 10,867,242 | B2* | 12/2020 | Graepel | G06N 3/045 |
| 2015/0100530 | A1* | 4/2015 | Mnih | A63F 13/67 |
| | | | | 706/25 |
| 2016/0292568 | A1* | 10/2016 | Schaul | G06N 3/08 |
| 2017/0140269 | A1* | 5/2017 | Schaul | G06N 3/088 |
| 2017/0337682 | A1* | 11/2017 | Liao | A61B 5/7267 |
| 2018/0032863 | A1* | 2/2018 | Graepel | G06N 3/045 |
| 2018/0032864 | A1* | 2/2018 | Graepel | G06F 16/9027 |
| 2018/0260707 | A1* | 9/2018 | Schaul | G06N 3/047 |
| 2019/0014488 | A1* | 1/2019 | Tan | G06N 3/044 |
| 2019/0126472 | A1* | 5/2019 | Tunyasuvunakool | G06N 3/08 |
| 2019/0251437 | A1* | 8/2019 | Finn | G06N 3/045 |
| 2019/0258938 | A1* | 8/2019 | Mnih | G06N 3/045 |
| 2021/0216822 | A1* | 7/2021 | Paik | G06T 7/0012 |

OTHER PUBLICATIONS

Bellemare et al. "The arcade learning environment: An evaluation platform for general agents." Journal of Artificial Intelligence Research, 47, Jun. 2013, 5 pages.

Brys et al. "Reinforcement Learning from demonstration through shaping," International Joint Conference on Artificial Intelligence, Jul. 2015, 7 pages.

Cederborg et al. "Policy shaping with human teachers," International Joint Conference on Artificial Intelligence, Jul. 2015, 7 pages.

Chmali et al. "Direct policy iteration from demonstrations," International Joint Conference on Artificial Intelligence, Jul. 2015, 7 pages.

De la Cruz Jr, et al. "Pre-training Neural Networks with Human Demonstrations for Deep Reinforcement Learning," arXiv 1709.04083, Sep. 12, 2017, 8 pages.

Duan et al. "One-shot imitation learning," arXiv 1703.07326 Dec. 4, 2017, 27 pages.

Finn et al. "Guided cost learning: Deep inverse optimal control via policy optimization," International Conference on Machine Learning, Jun. 2016, 10 pages.

Fortunato et al. "Noisy networks for exploration," arXiv 1706.10295, Feb. 15, 2018, 21 pages.

Hasselt et al. "Deep reinforcement learning with double Q-learning," AAAI Conference on Artificial Intelligence, Feb. 2016, 7 pages.

Hester et al. "Learning from Demonstrations for Real World Reinforcement Learning," arXiv 1704.03732v1, Apr. 12, 2017, 11 pages.

Hester et al. "TEXPLORE: Real-time sample-efficient reinforcement learning for robots," Machine Learning, 90(3), Mar. 2013, 45 pages.

Ho et al. "Generative adversarial imitation learning," Advances in Neural Information Processing Systems, Dec. 2016, 9 pages.

Hosu et al. "Playing Atari games with deep reinforcement learning and human check-point replay," arXiv 1607.05077, Jul. 18, 2016, 6 pages.

Jaderberg et al. "Reinforcement learning with unsupervised auxiliary tasks," arXiv 1611.05397, Nov. 16, 2016, 14 pages.

Kim et al. "Learning from limited demonstrations," Advances in Neural Information Processing Systems, Dec. 2013, 9 pages.

Kingma et al. "Adam: A method for stochastic optimization," arXiv 1412.6980v9, Jan. 30, 2017, 15 pages.

Kurin et al. "The atari grand challenge dataset," arXiv 1705.10998, May 31, 2017, 10 pages.

Lakshminarayanan et al. "Reinforcement learning with few expert demonstrations," NIPS Workshop on Deep Learning for Action and Interaction, Dec. 2016, 8 pages.

LeCun et al. "Deep Learning," Nature 521(7553) May 2015, 10 pages.

Levine et al. "End-to-end training of deep visuomotor policies," Journal of Machine Learning, Jan. 2016, 40 pages.

Lipton et al. "Efficient exploration for dialog policy learning with deep BBQ network and replay buffer spiking," arXiv 1608.05081, Aug. 17, 2016, 16 pages.

Mnih et al. "Asynchronous methods for deep reinforcement learning", International Conference on Machine Learning, Jun. 2016, 10 pages.

Mnih et al. "Human-level control through deep reinforcement learning," Nature, 518, Feb. 2015, 13 pages.

Piot et al. "Boosted and Reward-regularized Classification for Apprenticeship Learning," International Conference on Autonomous Agents and Multiagent Systems, May 2014, 8 pages.

Piot et al. "Boosted bellman residual minimization handling expert demonstrations," European Conference on Machine Learning, Sep. 2014, 17 pages.

Ross et al. "A reduction of imitation learning and structured prediction to no-regret online learning. " International Conference on Artificial Intelligence and Statistics, Apr. 2011b, 9 pages.

Schaal "Learning from demonstration," December NIPS, 1997, 7 pages.

Schaul et al. "Prioritized experience replay," Proceedings of the International Conference on Learning Representations, May 2016, arxiv 1511.05952v4, 21 pages.

Shani et al. "An mdp-based recommender system," Journal of Machine Learning Research, Sep. 6, 2005, 31 pages.

Silver et al. "Mastering the game of Go with deep neural networks and tree search," Nature, 529, Jan. 2016, 20 pages.

Srivastava et al. "Dropout: A simple way to prevent neural networks from overfitting," Journal of Machine Learning Research, 15(1), Jun. 2014, 30 pages.

Suay et al. "Learning from demonstration for shaping through inverse reinforcement learning," International Conference on Autonomous Agents and Multiagent Systems, May 2016, 9 pages.

Subramanian et al. "Exploration from demonstration for interactive reinforcement learning," International Conference on Autonomous Agents and Multiagent Systems, May 2016, 10 pages.

Sun et al. "Deep aggrevated: Differentiable imitation learning for sequential prediction," arXiv 1703.01030, Mar. 3, 2017, 17 pages.

Sutton et al. "Horde: A scalable real-time architecture for learning knowledge from unsupervised sensorimotor interaction," The 10th International Conference on Autonomous Agents and Multiagent Systems, vol. 2, May 2011, 8 pages.

Syed et al. "A game-theoretic approach to apprenticeship learning," NIPS, Dec. 2007, 8 pages.

Syed et al. "Apprenticeship learning using linear programming," International Conference on Machine Learning, Jul. 2008, 8 pages.

Taylor et al. "Integrating reinforcement learning with human demonstrations of varying ability" International Conference on Autonomous Agents and Multiagent Systems, May 2011, 8 pages.

Wang et al. "Dueling network architectures for deep reinforcement learning," International Conference on Machines Learning, Jun. 2016, 9 pages.

Watter et al. "Embed to control: A locally linear latent dynamics model for control from raw images," NIPS, Dec. 2015, 9 pages.

* cited by examiner

TRAINING ACTION-SELECTION NEURAL NETWORKS FROM DEMONSTRATIONS USING MULTIPLE LOSSES

CROSS-REFERENCE TO RELATED APPLICATION

This application is a continuation of U.S. patent application Ser. No. 16/174,148, filed on Oct. 29, 2018, which claims priority to U.S. Provisional Application No. 62/578,367, filed on Oct. 27, 2017. The disclosure of the prior applications are considered part of and are incorporated by reference in the disclosure of this application.

BACKGROUND

This specification relates to training action selection neural networks from demonstrations. The neural networks may afterwards be further trained using reinforcement learning techniques.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a system that learns to select actions to be performed by an agent interacting with an environment. In order for the agent to interact with the environment, the system receives data characterizing the current state of the environment and selects an action to be performed by the agent in response to the received data. Data characterizing a state of the environment will be referred to in this specification as an observation. The system learns a task by observing demonstrations of the task.

In some implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

In some other implementations the environment is a real-world environment comprising items of electrical equipment, for example in a data center or part of a utility distribution system such as a grid mains power or water distribution system. Then the observations may comprise one or more observations of power or water usage by items of equipment, for example for cooling or manufacturing, or observations of power generation or distribution control, or observations of usage of a resource, or observations of waste production. The agent may then control actions in the environment to increase efficiency and/or reduce the environmental impact of operations in the environment.

In some further implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

Thus the observations may include one or more of images, object position data, and sensor data, for example data from robot arm position or velocity sensors.

In one aspect a method of training a neural network system using demonstrations comprises training an action selection neural network to perform a demonstrated task using a supervised learning technique to learn demonstrated actions of the demonstrated task, more particularly using the supervised learning technique to train the neural network to perform demonstrated actions of the demonstrated task. The action selection neural network has a plurality of action selection network parameters and is configured to receive inputs, e.g. from demonstration data, comprising observations of an environment in which the task is demonstrated, more particularly of the demonstrated actions, and to process the inputs in accordance with the network parameters to generate action selection outputs indicating actions to be performed. Training the action selection policy neural network may comprise adjusting values of the action selection network parameters using a supervised learning technique, e.g. employing multiple combined losses, to bring the actions to be performed indicated by the action selection output closer to the demonstrated actions. Once trained, the action selection neural network is able to select actions to be performed by an agent interacting with the environment to perform the previously demonstrated task.

During training of the action selection neural network each of one or more auxiliary prediction task neural networks is trained. Each of the auxiliary prediction task neural networks has respective auxiliary prediction task network parameters and is configured to receive a respective intermediate output from the action selection neural network. When multiple auxiliary prediction task neural networks are present these may be the same or different intermediate outputs. Each of the auxiliary prediction task neural networks generates a task-related prediction output which indicates a predicted characteristic of the demonstrated task. Training each of the one or more auxiliary prediction task neural networks comprises adjusting values of both the respective auxiliary prediction task network parameters and the action selection network parameters to bring the predicted characteristic closer to a corresponding subsequently-observed characteristic of the demonstrated task. This may be done by backpropagating gradients through an auxiliary prediction task neural network into the action selection neural network. The gradients may be determined from an auxiliary supervised learning loss function. This may define a difference between the auxiliary task-related prediction output, which indicates a predicted characteristic of the demonstrated task, and an actual characteristic of the demonstrated task determined from a later observation. The auxiliary prediction task neural network and the action selection neural network may be trained jointly to decrease the auxiliary supervised learning loss function.

Advantages of embodiments the method are described later and include improved ability to learn from expert demonstrations of a task. In broad terms the supervised learning is used to match the action selection neural network outputs to the demonstrated actions/task, and the auxiliary prediction task neural network(s) help the system to learn more efficiently from relatively small data sets, in particular by helping the action selection neural network to learn useful internal representations of the task.

The auxiliary prediction task neural networks may include a network to predict a demonstrated action at a subsequent observation to a current observation. The auxiliary prediction task neural networks may each be coupled to an intermediate output of the action selection neural network and may be trained concurrently with the action selection neural network. For example the neural network may be trained based on a current observation and an action for a next observation may be predicted. A supervised learning loss function may be used for classifying the demonstrated actions. For example action values from the action selection policy neural network may be used to classify the demonstrated actions, for example by providing them as logits to a softmax function. The overall loss function may thus include an auxiliary loss function predicting the classification of an action. The loss function may, for example, be a cross-entropy loss.

In some implementations the action selection neural network may be trained, potentially concurrently, using both supervised learning and a reinforcement learning technique. This allows method to take advantage of reward signals from the environment e.g. during performance of a task. Any type of reinforcement learning may be used, and the use of reinforcement learning is not essential.

The auxiliary tasks may include prediction of one or more Q-values. The predicted Q-value(s) may be discounted by one or more discount factors which determine a timescale over which future rewards are taken into account.

Additionally or alternatively a 1-step and/or n-step reward may be estimated, where an n-step reward estimates a return after n state-action time steps. To train the system a loss function may define a difference between a predicted reward at a current observation of the environment and an actual reward received at a subsequent observation or time step and the system may be trained to decrease this loss. In some implementations the action selection neural network comprises a convolutional neural network, although a recurrent neural network may additionally or alternatively be employed.

In some implementations the auxiliary prediction task neural networks may also include a network to predict termination of the demonstrated task. Other auxiliary prediction tasks may additionally or alternatively be employed, for example a pose-prediction task to predict a pose of an entity in the environment, for example the pose of an object or robot arm. One or both of the action selection network parameters and the auxiliary prediction task network parameters may comprise neural network weights including noise characterizing parameters. For example noise characterizing parameters may be employed in one or more output or fully-connected layers of the action selection neural network and/or of an auxiliary prediction task neural network. A weight may comprise a mean value parameter, and a variance or standard deviation value parameter which may be used to sample from a noise distribution. Training the action selection policy neural network may then include adjusting values of the noise characterizing parameters. This can significantly improve regularization and can be particularly helpful in the context of a small dataset when overfitting might otherwise be a problem.

The action selection neural network may have a policy output to determine actions to be performed by the agent once trained. The policy output may identify a particular action, or may provide a probability distribution over a set of possible actions, or may provide a Q-value for an action, i.e., an estimated time-discounted reward if the agent performs the action.

Once trained the trained neural network system may be used to perform the demonstrated task without further training. Thus in some implementations the system ceases learning after learning from the demonstrated task; in other implementations the system may continue learning when in use, for example using reinforcement learning. Optionally one demonstration task may be used to evaluate when the system does not require further training and is ready for use.

In another aspect a neural network system comprises an action selection neural network configured to learn a demonstrated task using a supervised learning technique to learn demonstrated actions of the demonstrated task. The action selection neural network may have a plurality of action selection network parameters and may be configured to receive inputs comprising observations of the demonstrated actions and to process the inputs in accordance with the network parameters to generate action selection outputs indicating actions to be performed. The system may further comprise one or more auxiliary prediction task neural networks. Each of the auxiliary prediction task neural networks may comprise a neural network head coupled to a respective intermediate output of the action selection neural network. The neural network head may have respective auxiliary prediction task network parameters and may be configured to generate a task-related prediction output which indicates a predicted characteristic of the demonstrated task. At least one of the auxiliary prediction task neural networks may have a task-related prediction output to predict a characteristic of the demonstrated task, for example predict a demonstrated action.

The subject matter described in this specification can be implemented in particular embodiments so as to realize one or more of the following advantages.

The described methods and systems can learn efficiently from relatively small amounts of data compared with the typically very large amounts of data normally needed for reinforcement learning. This facilitates rapid learning from expert demonstrations of the system/agent as it is intended to be used. In some implementations the system may learn solely from the demonstrations. Despite this embodiments of the system/method also have reduced susceptibility to over-fitting. Use cases include a human being controlling or manipulating a robot or other mechanical agent to provide a demonstration of a task, for example on a factory floor, and using the method/system to train the neural network system using the demonstration to control the robot or other mechanical agent to perform the task. In broad terms the human moves the robot around to perform actions and the method/system then is able to repeat the actions.

The described techniques are able to use previous human (or machine) experience to train a machine learning system to control an agent to operate in the real or a virtual world with improved safety and effectiveness. The agent may be a machine or may control the operation of an industrial plant or data center. Some implementations of the method/system include evaluation of the performance of a system before deployment, hence facilitating safe operation. In addition the training techniques described allow faster training with less data than, for example, some reinforcement learning techniques. Thus less memory and computer processing power may be needed for the training. Further advantages are indicated later.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Reinforcement learning systems can learn to perform a task but may require very large amounts of training data and/or exploration of large portions of the environment state space. In addition the performance of a reinforcement learning system may be poor during training. All these can cause difficulties when applying reinforcement learning in the real world, for example to control of a vehicle or data center. By contrast some implementations of the system described herein address real world applications in which there may be little or no opportunity for training the system in situ prior to deployment.

Figure 1:
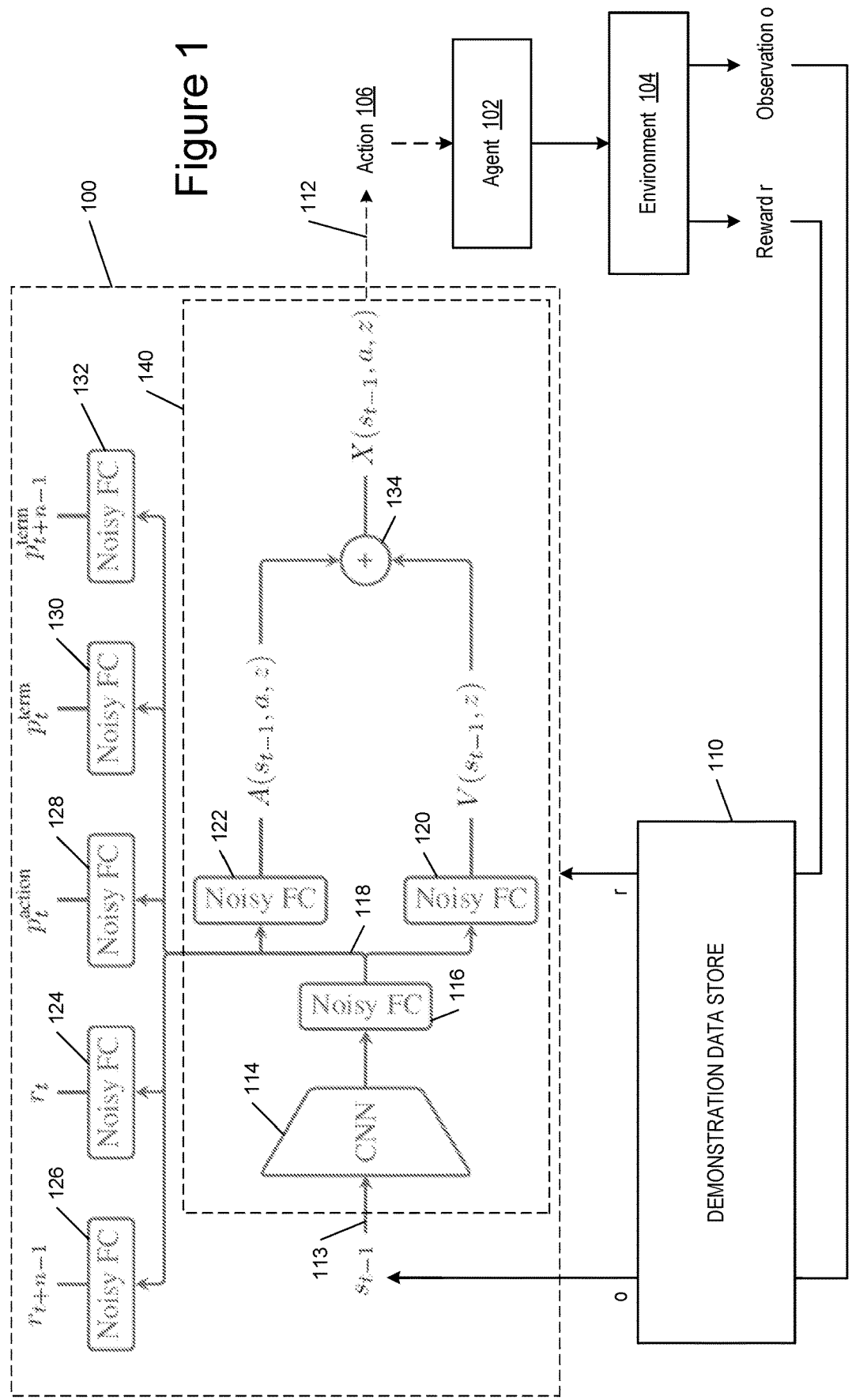
FIG. 1 shows an example neural network system for learning a demonstrated task.

Thus FIG. 1 shows an example neural network system 100 for learning a demonstrated task. The neural network system 100 is an example of a system implemented as computer programs on one or more computers in one or more locations, in which the systems, components, and techniques described below can be implemented. The neural network system 100 includes a data store 110 configured to store demonstration data for a task to be learned.

The demonstration data may comprise data demonstrating actions to perform a task and rewards, r, received for performing the actions. The demonstration data may be derived from an agent 102 interacting with an environment 104 at each of multiple time steps to perform the task. Data characterizing a state, s, of the environment 104 is referred to in this specification as an observation, o.

The demonstration data may be derived from an expert demonstration of the task, where the expert may be a human or machine entity which is able to perform the demonstration of the task. The demonstration may be performed in the real world or in simulation. The neural network system 100 may be trained, as described later, so that it has good on-line performance from the time of its deployment. In some implementations the system may have no training prior to deployment other than from the expert demonstration. Therefore there is also described a technique for evaluating performance of the system prior to deployment. After training, the neural network system 100 may output data for selecting actions 106 to be performed by the agent 102 to perform the same or a similar task as that demonstrated.

The environment may be a real-world environment and the agent may be a mechanical agent, such as a robot interacting with the environment to accomplish a task, e.g. to locate an object or move an object to a specified location; or such as an autonomous or semi-autonomous land or air or sea vehicle navigating through the environment where the task may be to navigate to a specified destination. Then the observations may include, e.g. images; object position data; and/or sensor data to capture observations as the agent interacts with the environment, for example sensor data from an image, distance, or position sensor or from an actuator. For example for a robot the observations may include data characterizing a state of the robot, e.g., one or more of: joint position, joint velocity, joint force, torque or acceleration, for example gravity-compensated torque feedback, and global or relative pose of a part of the robot such as an arm and/or of an item held by the robot. The observations may include one or more of: the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment. The actions may be control inputs to control the agent, e.g., torques for the joints of a robot, or torques for a control surface or other control element of a vehicle; or higher-level control commands. Thus the actions may include e.g. position, velocity, or force/torque/acceleration data for one or more joints of a robot or parts of another mechanical agent. Action data may include data for these actions and/or electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle. Similar data may be used in a simulated environment which includes a simulation of the agent to provide simulated observations in response to simulated actions.

In some other applications the agent may be electronic or electro-mechanical and configured to control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. For example the observations may include data from one or more sensors monitoring part of a plant or service facility such as current, voltage, power, temperature and other sensors and/or electronic signals representing the functioning of electronic and/or mechanical items of equipment. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility. In other applications the environment is a real-world environment and the agent manages distribution of tasks across computing resources e.g. on a mobile device and/or in a data center. In these implementations, the actions may include assigning tasks to particular computing resources.

Referring again to FIG. 1, the demonstration data store 110 may store experience tuples comprising, for each time step, an observation at the time step, an action taken at the time step, a reward received as a result of the action, and a new observation for the next time step.

During training the neural network system 100 receives experience tuples including observations from the demonstration data store 110 and is trained as described later. When operationally deployed the neural network system 100 receives observations from the environment and is configured to process the observations to generate action selection outputs on a policy output 112, for selecting actions 106 to be performed by the agent 102.

The policy output may identify a particular action, for example an action predicted to maximize the long-term reward, or may define a probability distribution over a set of actions. In some implementations the policy output defines a Q-value, Q(s,a), for each of a set of discrete actions, a, where the Q-value is an estimate of the future return (reward) expected if the action a is performed in response to an observation characterizing the state s. More particularly the Q-value is an estimate of the long-term time-discounted future reward that would be received by the agent when following an action selection policy defined by the neural network system 100.

In some implementations the neural network system 100 is configured to determine distributions over the predicted returns for the policy output 112. More particularly, rather than determine a Q-value for each action the system may determine a state-value distribution X(s, a, z) for a set of n "atoms", each corresponding to a discrete Q-value, z, within a defined range, where the state-value distribution defines the probability of each Q-value. Thus the probability of Q-value $z_i$ is given by $X(s, a, z_i)$, and a Q-value for use in selecting an action may be determined from a mean of the state-action value distribution, $Q(s, a) = \Sigma_i z_i X(s,a,z_i)$. Such techniques are further described in "A Distributional Perspective on Reinforcement Learning", M. G. Bellemare et al., arXiv 1707.06887, to which reference may be made. The state-value distribution may be used to select an action to be performed by the agent, for example by selecting an action which maximizes the Q-value. Learning a distributional Q-value may help to extract more information from the demonstration data, and may make the learned behavior more stable, for example by giving the system more information with which to respond when the agent is away from a demonstrated trajectory. It may also facilitate learning from less data.

In the example system of FIG. 1 the observations comprise pixels of an image of the environment and these provide an input 113 to a deep convolutional neural network (CNN) 114 comprising a set of convolutional neural network layers followed by one or more fully-connected layers 116. The one or more fully-connected layers 116 provide one or more intermediate outputs 118. Together these neural network layers constitute an action selection neural network 140.

The one or more intermediate outputs 118 provide an input to a set of neural network heads 120-132 each comprising one or more fully-connected layers and having a respective output. Each neural network head constitutes a respective auxiliary task prediction neural network.

The neural network heads 124-132 serve as auxiliary task prediction neural networks as described further later; these are only used during training. The auxiliary task prediction neural network heads facilitate learning, in particular learning from image pixels with only small amounts of demonstration data. One or more auxiliary prediction tasks may be implemented by the neural network heads 124-132 as follows: Neural network head 124 may predict a 1-step reward $r_t$, that is the expected reward at time step t when at step t−1. Neural network head 126 may predict an n-step reward $r_{t+n-1}$, that is the expected reward or return looking ahead over the next n time steps. Neural network head 128 may predict the expert i.e. demonstrated action at time step t when at step t−1, that is it may provide a likelihood value $p_t^{action}$ for each of the actions at time t. Neural network head 130 may provide a value, $p_t^{term}$ for the likelihood of termination of the task at time step t when at step t−1. Neural network head 132 may provide a value, $p_{t+n-1}^{term}$, for the likelihood of termination of the task at any point in the next n time steps when at step t−1.

In some implementations the (distributional) Q-value may be determined, as illustrated, from an advantage function A(s, a, z) and a value function V(s, z) where the advantage of a state is defined as the difference between the Q-value for an action in the state and the value of the state, in distributional terms A(s, a, z)=X (s, a, z)−V(s, z). Rather than determining X(s, a, z) directly the advantage and value functions may be determined by respective heads 122, 120 and combined by an aggregator 134 to provide X(s, a, z), which determines the Q-value. The value of a state is the expected reward in that state averaged over possible actions; the advantage is the expected reward when selecting a particular action a then following the action selection policy defined by the system. The parameters of the neural network system providing the advantage and value functions are trained by back propagation based upon the output Q-value or Q-value distribution. The Q-value/distribution does not uniquely determine the state value and advantage. However an additional constraint may be applied because the advantage function estimator should define a zero advantage for the chosen action. Thus in some implementations the Q-value/distribution for the selected (maximum mean Q-value) action may be taken to define the value function, thus also allowing an estimate of the advantage function to be determined. This may be implemented by aggregator 134. In some other implementations rather than using the maximum Q-value action to define a zero advantage, an average Q-value/distribution may be employed, which loses some of the semantics of the value function but can be more stable. For further details reference may be made to Wang et al., "Dueling network architectures for deep reinforcement learning", arXiv 1511:06581.

In some implementations some or all of the fully-connected layers are configured to employ noisy weights; additionally or alternatively the CNN 114 may employ noisy weights. The use of noisy weights can help the system generalize, reducing the risk of the system overfitting to the typically relatively small amount of demonstration data which could otherwise make the system perform less well when deployed. For example a real-world task will generally differ at least slightly from an expert demonstration, whether in the real world or in simulation. Use of noisy weights in the auxiliary task network heads is beneficial for similar reasons, inducing noisy updates of the system parameters.

To implement this each weight, w, of a set of weights of a fully connected layer, and a bias where used, may be replaced by $\mu+\sigma\cdot\epsilon$ where $\mu$ is a mean, $\sigma$ is a standard deviation and $\epsilon$ is a noise value with, e.g. zero mean and fixed statistics. The parameters $\mu$ and $\sigma$ may be learned by back propagation; the noise E may be sampled at each inference of the system. For example if the layer parameters of a noisy layer define a weight matrix w and a bias vector b, then the system may determine the noisy current values of the weight matrix w and the bias vector b as:

$w=\mu+\sigma\odot\epsilon$ $b=\mu^b+\sigma^b\odot\epsilon^b$ where $\mu$ denotes the current values of the weight matrix, $\sigma$ denotes a matrix of noise parameters, $\odot$ denotes the element-wise product, $\epsilon$ denotes a matrix of noise values, $\mu^b$ denotes the current values of the bias vector, $\sigma^b$ denotes a vector of noise parameters, and $\epsilon^b$ denotes a vector of noise values. Such techniques are further described in "Noisy Networks for Exploration", M. Fortunato et al., arXiv 1707.10295, to which reference may be made.

In some implementations, during training the neural network system 100 samples a minibatch of experience tuples from the demonstration data. The system backpropagates gradients of a loss function to adjust values of parameters i.e. weights of the neural network system 100, for example based on a sum of the gradients from the examples in the minibatch. In some implementations the neural network system 100 uses a combination of one or more of five losses: a 1-step TD (temporal difference) loss, an n-step TD loss, a supervised classification loss, a loss from the auxiliary task(s), and a regularization loss such as an L2 regularization loss, $J_{L2}(Q)$, on the network weights. The TD losses may be distributional TD losses. The classification loss is used for classification of the actions taken by the expert in the demonstration data. The TD loss(es) use the task rewards from the demonstration data to learn an action value function. The regularization loss also helps to prevent the system over-fitting to the demonstration data.

In one example the supervised classification loss may be a loss which encourages the Q-value output to define actions which match the demonstrated actions. The state-action values Q (s, a) may be treated as logits and processed by a softmax function, and a cross-entropy classification loss, $J_E(Q)$ may be defined as:

$$J_E(Q) = -\log\frac{\exp(Q(s, a_e))}{\sum_{a'\in A}\exp(Q(s, a'))}$$

where $a_e$ is the demonstrated action of a set of A possible actions in a state s which is characterized by the corresponding observation. Where a distributional Q-value is determined the mean of the state-action value distribution may be used for Q (s, a). The effect of backpropagating this loss is to encourage the Q-values for the demonstrated actions to be as far above the Q-values for the other actions as possible.

The experience tuples include the rewards received as a result of the actions taken. Thus the losses may also include one or more TD losses, which can help to extract more useful training data from the demonstrated actions.

A 1-step return in progressing from the state at time step t-1 to the state at time step t can be defined as:

$$q_{t-1}^1 = r_t + \max_a \gamma Q(s_{t+1}, a)$$

where $\gamma$ is a discount factor, e.g. 0.99, to reduce the importance of future rewards. In a similar way an n-step return can be defined as:

$$q_{t-1}^n = r_t + \gamma r_{t+1} + \ldots + \gamma^{n-1} r_{t+n-1} + \max_a \gamma^n Q(s_{t+n-1}, a)$$

Corresponding loss functions can then be defined as, e.g.

$J_1(Q)=(q_{t-1}^1-Q(s_{t-1},a))^2$ $J_n(Q)=(q_{t-1}^n-Q(s_{t-1},a))^2$

The n-step rewards can be obtained by retrieving a time sequence of experience tuples from the demonstration data store starting from time step t.

In some implementations a distributional Q-value is employed to estimate a distribution over returns as previously described. Then the above loss functions may be replaced by distributional loss functions, as described in Bellemare et al., ibid., in particular at section 4.2, in equation (7) and by the corresponding KL-divergence, further described there in "Algorithm 1". In an example implementation there are 50 atoms and n=5. Use of a distributional Q-value can help to extract further useful training data from the demonstrated actions.

The neural network system may be trained to perform one or more auxiliary losses, which can help to extract still further useful training data from the demonstrated actions. Each auxiliary task may comprise a prediction of future information based on the current state, where the future information is derivable from the demonstration data set for supervised training of the system. More particularly each prediction may be provided by a corresponding neural network head sharing at least some parameters with the portion of the neural network system 100 providing the action selection outputs i.e. Q-values. In the example of FIG. 1 this portion of the neural network system 100 comprises the convolutional neural network layers 114 and one or more fully-connected layers 116. Each neural network head is trained using a corresponding loss function and gradients are backpropagated through the neural network head into the portion of the neural network system 100 providing the action selection outputs.

In the example of FIG. 1 neural network head 128 is trained using a cross-entropy classification loss, $J_{class}$, based on the stored demonstrated actions. Neural network heads 126 and 124 are trained to predict the reward looking ahead 1 and n time steps respectively, based on the stored demonstrated data, using respective L2 regression losses, together $J_{reward}$. Neural network heads 130 and 132 are trained to predict termination of the task looking ahead 1 and n time steps respectively, based on the stored demonstrated data, using respective cross-entropy losses, together $J_{term}$. In addition where a distribution Q-value is determined the neural network system 100 may be trained using a non-distributional Q-value loss (e.g. on a mean Q-value output) using a 1- or n-step loss as described above, optionally with multiple discount factors to train the system to predict values at different time horizons. Together these losses may be denoted $J_{value}$. In an example implementation discount factors of 0.9, 0.99 and 0.999 are used.

The total auxiliary loss, $J_{aux}(Q)$ may be a weighted combination of these losses:

$$J_{aux}(Q) = \lambda_{class}J_{class}(Q) + \lambda_{value}J_{value}(Q) + \lambda_{reward}J_{reward}(Q) + \lambda_{term}J_{term}(Q)$$

Although written as a single loss, in practice the losses are applied separately to the respective neural network heads.

The total loss, J(Q), used to update the parameters of the to the neural network system 100 may be a combination of the above described losses:

$$J(Q) = \lambda_0 J_1(Q) + \lambda_1 J_n(Q) + \lambda_2 J_E(Q) + \lambda_3 J_{aux}(Q) + \lambda_4 J_{L2}(Q)$$

where the parameters $\lambda_0 \ldots \lambda_4$ determine the relative weightings of the losses. In practice these losses may be applied separately to different parts of the system such as the various neural network heads, although all may backpropagate gradients into the portion of the system between the input 113 and intermediate output 118.

Figure 2:
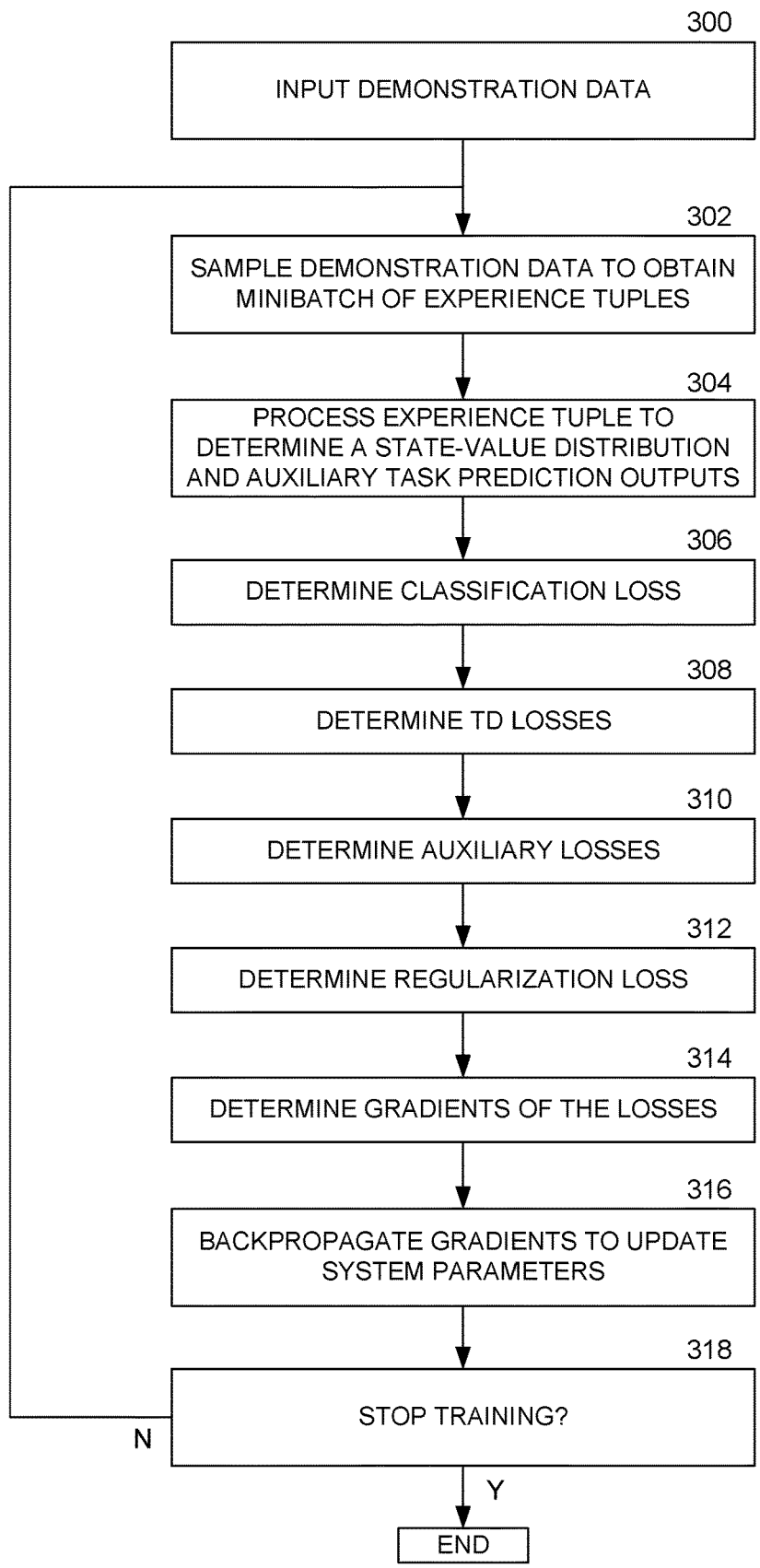
FIG. 2 is a flow diagram of an example process for training the neural network system of FIG. 1.

Referring to FIG. 2 this shows a flow diagram of an example process for training the neural network system of FIG. 1. Thus the neural network system 100 first receives a set of demonstration data (step 300), which may be stored in demonstration data store 110. The demonstration data may, for example, define a set of demonstration trajectories each comprising a series of states and actions and one or more rewards, leading from a start point to an end point of a task.

The system then randomly samples the demonstration data to obtain an experience tuple or a minibatch of experience tuples (step 302). The or each experience tuple is then processed to determine the state-value distribution X(s, a, z) and auxiliary task prediction outputs from neural network heads 124-132 (step 304).

The system then determines, in any order, the classification loss $J_E$ (step 306), the TD losses $J_1$, $J_n$ (step 308), the auxiliary losses $J_{aux}$ (step 310), and the regularization loss $J_{L2}$ (step 310). Where a minibatch is sampled these may be averaged over the minibatch; the losses may be weighted as described above. The procedure then determines gradients of these losses (step 314), and backpropagates the gradients through the neural network system to update the neural network system parameters (step 316). The losses are backpropagated into the action selection neural network 140; the auxiliary losses are backpropagated through their respective auxiliary network heads into the layers below the one or more intermediate outputs 118 of the action selection neural network 140.

At intervals, for example every iteration, the neural network system 100 may evaluate progress of the training, in order to determine whether or not to stop training (step 318). If training continues the procedure loops to step 302; otherwise the procedure ends. The training progress may be evaluated using a held-out trajectory from the demonstration data store i.e. a trajectory which is not being used for training, for example using one or more of the losses as determined for the held-out trajectory.

Figure 3:
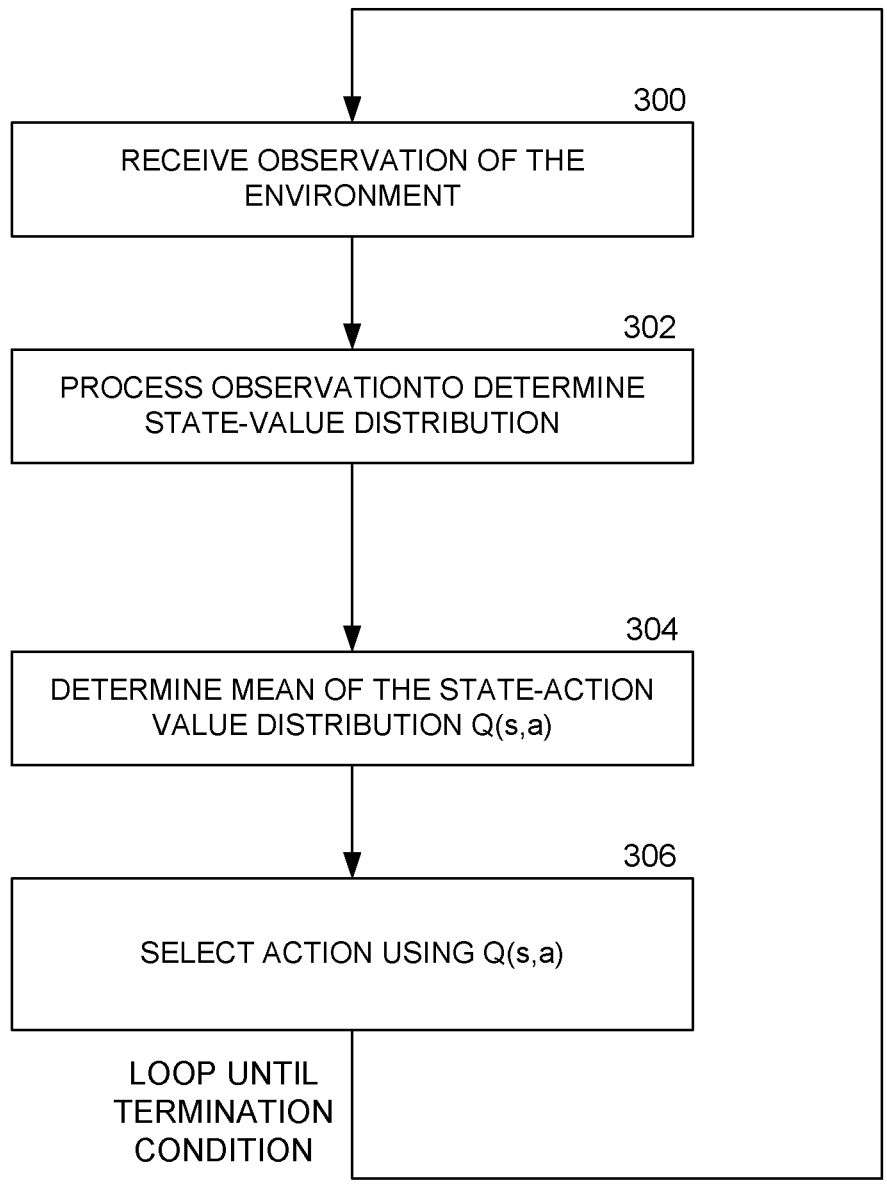
FIG. 3 is a flow diagram of an example process for using the neural network system of FIG. 1, after training with the process of FIG. 2, to perform a task.

Referring to FIG. 3 this shows a flow diagram of a process for using the neural network system 100, after training, to perform a task. Thus the system receives an observation of the environment (step 300), and processes this to determine the state-value distribution X(s, a, z) for the state represented by the observation (step 302). The system then determines a mean value of this distribution for each action, averaged over atoms of the distribution (step 304), and selects the action with the maximum mean value (step 306). An epsilon-greedy action selection policy may be used to add stochasticity, selecting the action with the maximum mean value with probability 1−ε and a random action with probability ε (where ε is a small, e.g. 0.01), particularly if the system is being further trained using reinforcement learning. The process then loops back to step 300 until the task is finished, i.e., until a termination condition is met. Optionally, application of the system to performance of the task may be combined with a reinforcement learning technique applied to the neural network system 100 during the performance of the task. This may use the TD losses described above and train on stored experience data as well as expert data from the data store. Thus the system may continue to learn after the initial, expert training.

Although the systems and methods described herein can be very beneficial in real world settings they may also be used in other applications. For example the agent may a computer system which recommends items or items of content to a user. In an example such application a state may be defined by a set of items previously selected by a user, $(x_1, x_2, \ldots, x_k)$, an observation may characterize such a state, an action may comprise recommending one or more items of content x', and if the recommendation is accepted the environment may be considered to have transitioned to a new state including x'. A reward may correspond to data indicating desirability of the user accepting the item/content. Historical data relating to user acceptance of items/content may correspond to an expert demonstration.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network system using demonstrations, the method comprising:
   training an action selection neural network to perform demonstrated actions of a demonstrated task,
   wherein the action selection neural network is configured to receive inputs comprising observations of an environment of the demonstrated task and to process the inputs to generate action selection outputs indicating actions to be performed, and
   during training of the action selection neural network:
      training each of one or more auxiliary prediction task neural networks, wherein each of the auxiliary prediction task neural networks is configured to receive a respective intermediate output from the action selection neural network and to generate a task-related prediction output which indicates a predicted characteristic of the demonstrated task,
      wherein training each of the one or more auxiliary prediction task neural networks comprises training each of the one or more auxiliary prediction task neural networks and the action selection neural network by backpropagating gradients determined from an auxiliary learning loss function through the one or more auxiliary prediction task neural networks and into the action selection neural network to bring the predicted characteristic closer to a corresponding subsequently-observed characteristic of the demonstrated task.

2. A method as claimed in claim 1, further comprising, during training of the action selection neural network:
   training the action selection neural network to select actions to be performed by an agent interacting with the environment to perform the demonstrated task using a reinforcement learning technique.

3. A method as claimed in claim 1 wherein the one or more auxiliary prediction task neural networks include an auxiliary prediction task neural network to predict a demonstrated action at a subsequent observation to a current observation, and wherein the predicted characteristic comprises a predicted demonstrated action.

4. A method as claimed in claim 1 wherein training the action selection neural network to perform the demonstrated task comprises training the action selection neural network using both a supervised learning technique and a reinforcement learning technique.

5. A method as claimed in claim 1 wherein the one or more auxiliary prediction task neural networks include an auxiliary prediction task neural network to predict one or more Q-values.

6. A method as claimed in claim 5 wherein the one or more Q-values comprise a time-discounted Q-value characterizing a future state of the environment.

7. A method as claimed in claim 1 wherein the one or more auxiliary prediction task neural networks include an auxiliary prediction task neural network to predict a reward from the environment at a subsequent observation to a current observation.

8. A method as claimed in claim 1 wherein the action selection neural network has a policy output to determine actions to be performed by an agent once trained, wherein the policy output defines, each possible action, a probability distribution over a set of possible returns, and wherein training the action selection neural network comprises estimating the probability distribution over the set of possible returns for each of the possible actions.

9. A method as claimed in claim 1 wherein the one or more auxiliary prediction task neural networks include an auxiliary prediction task neural network to predict termination of the demonstrated task.

10. A method as claimed in claim 1 wherein one or both of action selection network parameters and auxiliary prediction task network parameters comprise neural network weights including noise characterizing parameters, and wherein training the action selection neural network further comprises adjusting values of the noise characterizing parameters.

11. A method as claimed in claim 1 further comprising using the trained neural network system to perform the demonstrated task.

12. A method as claimed in claim 11 wherein the trained neural network system learns solely from the demonstrated task prior to using the trained neural network system to perform the demonstrated task.

13. A method as claimed in claim 1 comprising controlling or manipulating a robot or other mechanical agent to provide a demonstration of a task, and training the neural network system using the demonstration to control the robot or other mechanical agent to perform the task.

14. A system comprising:
   one or more computers; and
   one or more storage devices communicatively coupled to the one or more computers, wherein the one or more storage devices store instructions that, when executed by the one or more computers, cause the one or more computers to perform operations of training a neural network system using demonstrations, the operations comprising:

training an action selection neural network to perform demonstrated actions of a demonstrated task, wherein the action selection neural network is configured to receive inputs comprising observations of an environment of the demonstrated task and to process the inputs to generate action selection outputs indicating actions to be performed, and during training of the action selection neural network:

training each of one or more auxiliary prediction task neural networks, wherein each of the auxiliary prediction task neural networks is configured to receive a respective intermediate output from the action selection neural network and to generate a task-related prediction output which indicates a predicted characteristic of the demonstrated task, wherein training each of the one or more auxiliary prediction task neural networks comprises training each of the one or more auxiliary prediction task neural networks and the action selection neural network by backpropagating gradients determined from an auxiliary learning loss function through the one or more auxiliary prediction task neural networks and into the action selection neural network to bring the predicted characteristic closer to a corresponding subsequently-observed characteristic of the demonstrated task.

15. A system as claimed in claim 14, wherein the operations further comprise, during training of the action selection neural network:

training the action selection neural network to select actions to be performed by an agent interacting with the environment to perform the demonstrated task using a reinforcement learning technique.

16. A system as claimed in claim 14 wherein the one or more auxiliary prediction task neural networks include an auxiliary prediction task neural network to predict a demonstrated action at a subsequent observation to a current observation, and wherein the predicted characteristic comprises a predicted demonstrated action.

17. A system as claimed in claim 14 wherein training the action selection neural network to perform the demonstrated task comprises training the action selection neural network using both a supervised learning technique and a reinforcement learning technique.

18. A system as claimed in claim 14 wherein the one or more auxiliary prediction task neural networks include an auxiliary prediction task neural network to predict one or more Q-values.

19. A system as claimed in claim 18 wherein the one or more Q-values comprise a time-discounted Q-value characterizing a future state of the environment.

20. One or more non-transitory computer storage media storing instructions that when executed by one or more computers cause the one or more computers to perform operations of training a neural network system using demonstrations, the operations comprising:

training an action selection neural network to perform demonstrated actions of a demonstrated task, wherein the action selection neural network is configured to receive inputs comprising observations of an environment of the demonstrated task and to process the inputs to generate action selection outputs indicating actions to be performed, and during training of the action selection neural network:

training each of one or more auxiliary prediction task neural networks, wherein each of the auxiliary prediction task neural networks is configured to receive a respective intermediate output from the action selection neural network and to generate a task-related prediction output which indicates a predicted characteristic of the demonstrated task, wherein training each of the one or more auxiliary prediction task neural networks comprises training each of the one or more auxiliary prediction task neural networks and the action selection neural network by backpropagating gradients determined from an auxiliary learning loss function through the one or more auxiliary prediction task neural networks and into the action selection neural network to bring the predicted characteristic closer to a corresponding subsequently-observed characteristic of the demonstrated task.

* * * * *